Sept. 12, 1944. C. T. RAY 2,358,280
TRACTOR PLANTER ATTACHMENT
Filed Jan. 14, 1941 2 Sheets-Sheet 2
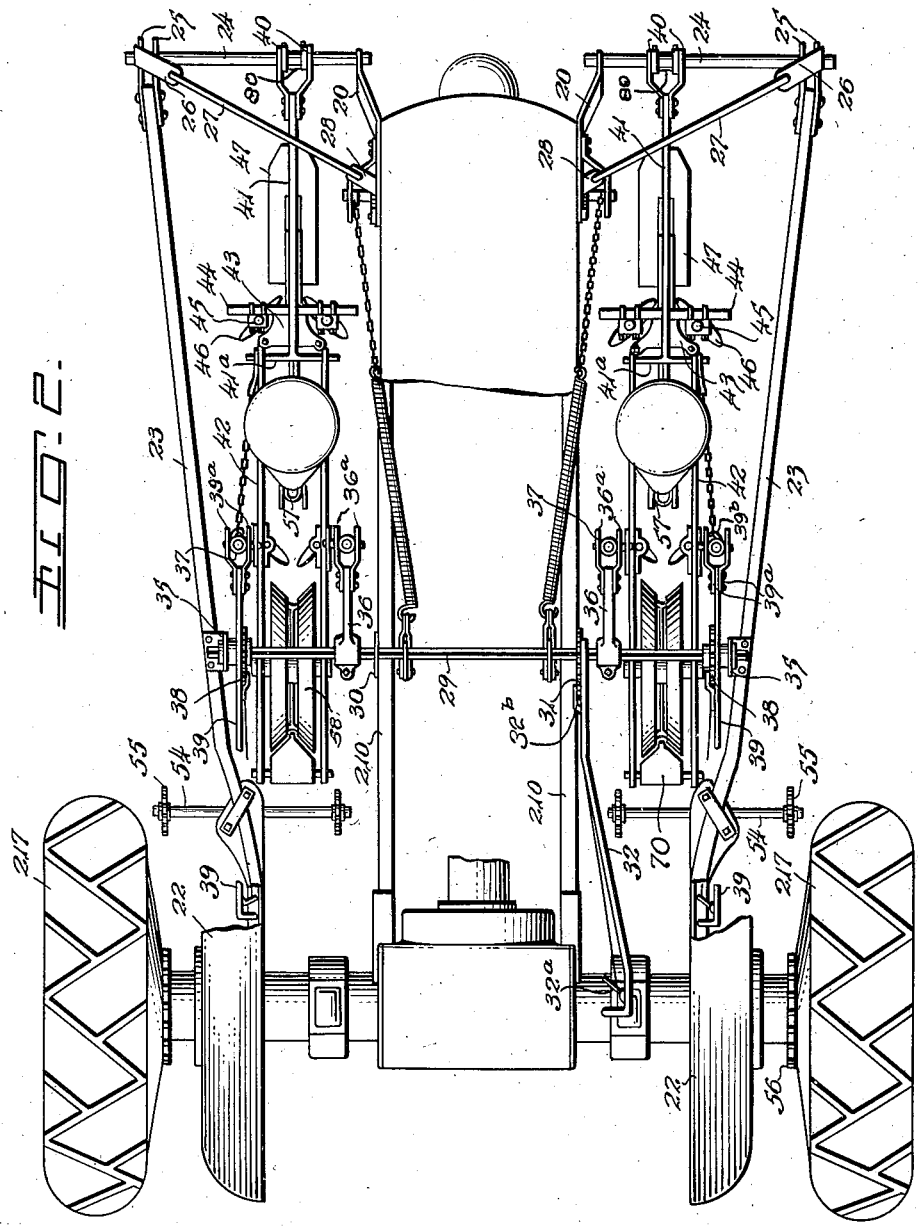
Inventor
CHARLES T. RAY Patented Sept. 12, 1944

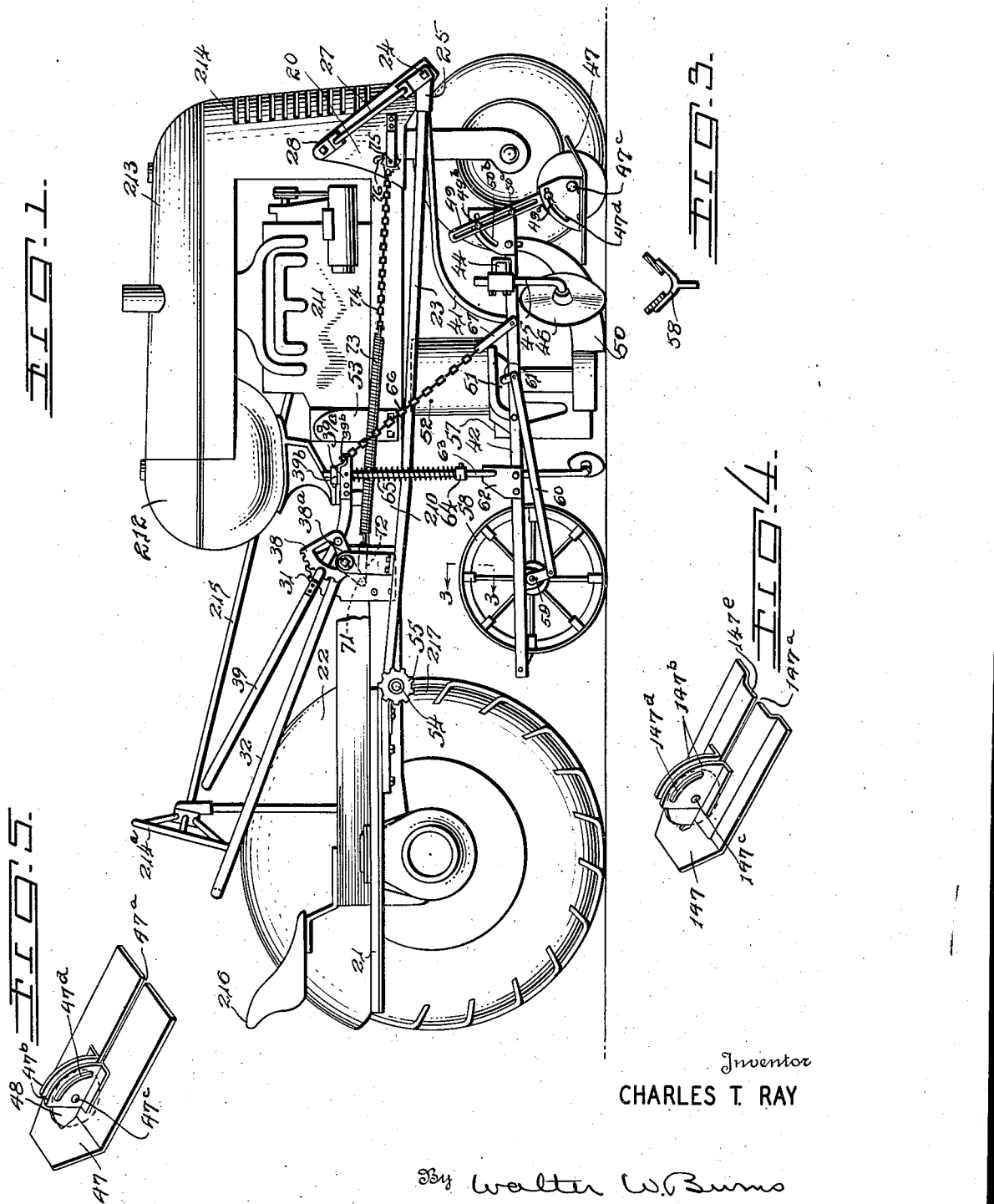

2,358,280

UNITED STATES PATENT OFFICE 2,358,280

TRACTOR PLANTER ATTACHMENT

Charles T. Ray, Louisville, Ky., assignor to B. F. Avery and Sons Company, Louisville, Ky., a corporation of Delaware Application January 14, 1941, Serial No. 374,393

4 Claims. (Cl. 97—47)

This invention relates to planters and has particular relation to those planters wherein planter attachments may be attached to a tractor.

The present invention involves a planter which has carrying wheels and has for its primary object the provision of an improved planter of this general type and of attachments for connecting it and operating it by power derived from the forward movement of the tractor.

Another object of the invention is the provision of an improved tractor planter and attachment wherein the true draft principle is applied to pulling the planter from the tractor in a manner in which a vehicle is pulled by a draft animal.

Still another object of the invention is the provision of a tractor attachment for a planter which has its own ground engaging supporting means, which attachment will permit of full and free bodily movement of the planter over the surface of the ground in a vertical plane but which is so constructed that this movement is confined to a vertical plane parallel to the line of draft.

A further object of the invention is the provision of such a planter wherein is provided a draft bar or frame means connected at its forward end to the tractor and at its rearward end to the planter in such a manner that a sudden jerk of the tractor either in going faster or slower will not tilt the planter either to a forward or backward position relative to its normal position.

Another and still further object of the invention is the provision of a tractor planter attachment with means provided for lifting both ends of the planter clear of the ground by a single operating means when the operating means is moved in one direction and when moved in the other direction to place yielding pressure on the rearward portion of the planter.

Another and still further object of the invention is the provision of an improved depth gauge shoe having a surface which will form a smooth surface on a row with the center portion, where the seed is to be planted, at a higher level.

Another and still further object of the invention is the provision of an improved depth gauge shoe which has a slit and with a colter wheel in the slit to open the earth for entry of the earth opening member of the planter.

Other and further objects of the invention will be apparent to those skilled in the art from a reading of the complete specification and claims.

Referring to the drawings wherein is illustrated an embodiment of the invention, Fig. 1 is a side view of a tractor with the invention attached thereto, parts being omitted and other parts broken away for purposes of clearness of illustration.

Fig. 2 is a plan view of the invention attached to the side of the tractor, parts being omitted or broken away for the sake of clearness of illustration.

Fig. 3 is a detail view taken on the line 3—3 of Fig. 1.

Figs. 4 and 5 are perspective views of different types of depth gauge shoes.

In the specification and drawings, the same reference characters are used to designate the same or similar parts.

Referring particularly to Figs. 1 and 2, 210 designates the frame of a tractor having an engine 211, a gasoline tank 212, a water reservoir 213 for a radiator behind the grille 214. Forward and beneath the frame 210 is a steering wheel unit which is controlled through suitable and well known worm and gear mechanism (not shown) by the steering wheel 214a and its shaft 215. On the rear portion of the frame is a seat 216 which is occupied by the operative when the tractor is in use. Rear wheels 217 are provided, which support the rear portions of the tractor and provide the traction with the ground. These wheels 217 are driven through suitable transmission mechanism from the engine 211. In Fig. 1, the near rear wheel has been omitted.

The present invention relates to planters and is designed for use with and for attachment to a tractor. While the method and means of attachment to the tractor provide for ample free and unhampered movement in a vertical plane when the planter is in operation, the planter itself is supplied with its own ground-engaging supporting means, which carry the weight of the planter and its coacting parts and furnish the power for operating the planter device, derived from the forward movement of the tractor.

The planter itself, herein described is in general, somewhat similar to some of the conventional animal drawn walking type planters which are provided with handles and tree attachments for animal draft, the handles being used by the operative to hold the planter in the desired upright position and to apply the desired pressure to keep the ground working elements in proper ground engagement.

By removing the handles of one of these planters, it could be attached in a manner according to the invention described herein and would work very well. In using the present invention, the tractor during planting operations has as its main functions to (1) pull the planter and (2) keep the planter in substantially the same vertical plane, permitting it to move upwardly and downwardly as determined by the ground engaging supporting means of the planter and at the same time taking the torsional strains incident to any tendency to move out of the predetermined plane.

The principles upon which this invention operates are those of the true draft which has always been sought by the farmer. With the animal pulling the implement forward and slightly upwardly, the farmer through the handles keeps the implement in an upright position and applies the necessary downward pressure on the rear portion of the frame to maintain proper working engagement with the ground.

Applying these principles to the tractor-attached planter, the planter is permitted to move up and down with the irregularities of the ground as the tractor pulls it forward and maintains not only its upright position but also by suitable downwardly pressing means, maintains proper contact with the ground. All this will now be described in detail.

Secured to each side of the forward end of the tractor frame 210 are bearing bracket-brace plates 20. Secured to the frame 21 of the fender 22 is the rear end of a draft frame member 23, the forward end of which is secured to a draft shaft or rod 24 at its outer end by the bearing member 25. A small bracket 26 is secured to the end of the rod 24 to which is secured one end of a brace rod 27. The inner end of the brace rod 27 is secured to another small bracket 28 mounted on the plate 20.

Extending across the main frame 210 is a square shaft 29 mounted to rotate in a suitable bearing plate 30 on the left side of the machine and a quadrant plate 31 on the right side of the machine. Rigidly mounted on the shaft 29 is a lifting lever 32 which is provided with the usual grip latch lever 32a which controls the usual latch device 32b for coaction with the notches of the quadrant 31 to hold the lever 32 and the shaft 29 in their respective adjusted positions. The outer ends of the shaft 29 are journaled in suitable bearings 35 mounted on the draft frame members 23.

On either side of the frame 210 is secured on the shaft 29 a lifting arm 36 which carries at its outer end a pair of arms 36a. Between these arms 36a are mounted a trunnion ring 37 for a purpose to be later set forth.

Adjacent the outer ends of the square shaft 29 and rigidly secured thereto are quadrants 38 which have coacting bearings 38a for pivotal support of the respective pressure adjusting levers 39. At the outer end of the levers 39 are a pair of arms 39a between which are mounted respective trunnion rings 37 similar to those already described. Also mounted on the outer arms 39 are hooks 39b for a purpose to be later described.

In the illustrated embodiment of my invention there is a planter unit on either side of the tractor. Pivoted on the draft rod 24 is a pair of arms 40 rigidly secured on opposite sides of a draft bar 41. The draft bar 41 is provided at its rear end with a T-shaped bearing member 41a the outer ends of which are pivotally mounted in a main planter frame 42. On the forward end of the frame 42 is mounted a plate 43 to which is secured a square cross frame member 44. On each side of the center of the frame is secured on the frame member 44, a spindle 45 on which at its lower end there is carried an opener disk 46. These spindles 45 are secured in place by adjustable clamps so that vertical horizontal and angular adjustments of the opener disks 46 may be made.

At the forward end of the frame is secured the forward ground engaging supporting member. As illustrated, it is a depth gauge shoe 47 having a turned up forward end. A slit 47a (see Fig. 5) is provided to accommodate a colter wheel 48.

Two upstanding plates 47b are secured, one on each side of the slit and are provided with bearings for the pivot pin 47c. A pair of supporting arms 49 are pivoted on the pivot pin 47c and carry a locking bolt 49a which passes through the arcuate slots 47d of the plates 47b. By loosening the bolt 49a, the shoe 47 may be moved about the pivot pin 47c in a vertical plane to secure the desired adjustment.

In Fig. 4 is illustrated a modified form of the depth gauge shoe wherein the shoe body 147 has a slit 147a, upstanding plates 147b, each having a bearing for the pivot pin 147c and slots 147d. This shoe body 147 differs from the body 47 in that it has an upwardly curved longitudinally extending central ground contacting surface 147e.

The operation of these depth gauges is the same in that they support the forward end of the planter to which attached. In the case of the shoe 47, it makes a flat plane path while the shoe 147 leaves an elongated mound of perfect contour but with the sides packed slightly more than the top of the mound.

At the rear of the slit of the shoe 47 is the center of the ground working implement which in the illustration is a furrow opener 50 which has a pivot pin 50a and an arcuate slot 50b. A bolt 49b passes through the slot 50b and secures the upper end of the pair of arms 49 in adjusted position.

The furrow opener 50 is secured at its forward end to the main frame 42 and at its rear end to the planter mechanism 51 below the hopper 52 which are both secured to the frame 42.

On the frame 210 of the tractor is a bracket 53 to which a fertilizer attachment is secured. This fertilizer attachment (not shown) is driven from the shaft 54 and the sprocket wheel 55 which is connected to sprocket wheel 56 by a sprocket chain (not shown). A boot 57 to which the fertilizer attachment is connected, is provided to guide the fertilizer to its place in the furrow. In the interest of clearness, the fertilizer attachment has been omitted as per se it is not a part of the invention.

The split wheel 58 is provided with a crank 59 which carries a connecting rod or pitman 60. The other end of the rod 60 is connected to and operates the planter mechanism through a crank 61.

On the frame 42 is a pair of plates 62 in which the lower ends of the rods 63 are pivoted. An adjustable ring 64 on the rod 63 regulates the lower end of the spring 65. The upper ends of the springs 65 bear against the rings 37 while the upper ends of the rods 63 pass freely between limits through the rings 37. A chain 66 is connected detachably at its upper end to the hook 39b and at its lower end to a strap 67 which strap at its lower end is secured to the forward portion of the frame. It has been found that only one chain 66 is sufficient to lift the front of the frame as will be described.

The operation of the invention as a whole will now be described. As illustrated in Fig. 1, the lever 32 is in a position where if it is lowered, the whole planter will be raised and if the lever 32 is raised, the planter will be lowered so that the furrow opener 50 and the colter wheel 48 will enter the ground.

If it is desired to operate the planter, the lever 32 is raised. This revolves the shaft 29 toward the front, lowering the outer ends of the lifting arms 36 and the outer lifting ends of the levers 39. The chain 66 becomes slack and the draft bar 41 pivoted on the draft rod 24 assumes control of the forward movement of the planter. It will be observed that the pivotal axis of the rear end of the draft bar 41 is substantially in a plane containing the center of load of the unit comprising the frame 42 and the parts it carries, and the axis of the forward end of the draft rod 24. The center of load will be somewhat lower than the center of gravity of the implement attachment due to the fact that as the attachment is pulled forward, the reaction with the soil tends to pull the forward end of the attachment downwardly. This is the preferred embodiment, for when a sudden movement or change of speed of the tractor occurs, the planter moves bodily without having either ground engaging supporting means lifted from or forced toward the ground.

As the planter moves over the ground, the split press wheel 58 closes the trench made by the colter wheel 48, the furrow opener 50 and the disk openers 46. This press wheel also operates the planter through the crank 59, rod 60 and crank 61 in the usual and well known manner. The scraper 70 mounted on the rear end of the frame 42, keeps the ground surfaces of the split press wheel clear of dirt.

If it is desired to move the parts to transport position, the lever 32 is moved rearwardly. This causes the adjustable heads on the rods 63 to contact the trunnion rings 37. Further movement of the lever 32, lifts the rear ends of the frames 42, at the same time, the chain 66 lifts the front end of the frame 42 and the whole planter is lifted bodily in a vertical plane, the draft bar 41 swinging about the draft rod 24 as a center.

When the planting operation is taking place, the forward and rearward ground engaging supporting means as the depth gauge shoe 47 and the split wheel 58, determine the movement of the furrow opener 50 and its coacting parts while the draft bar 41 constrains the movement to a vertical plane, taking up the torsional tendencies which would otherwise permit movement outside the predetermined plane.

To assist in the lifting of the planters, counter balance devices are provided. On the shaft 29 are two downwardly extending arms 71 having links 72 to which counter balance springs 73 are attached. At the other ends of the springs 73 are attached chains 74 which are wound on the ratchet shaft 75 held in place with a suitable dog 76.

When the planting operation is being carried out, pressure on the rear ends of the frame may be exerted by moving the lever 39 upwardly and to the front. This action causes the trunnion rings 37 to press downwardly on the springs 65 to, in turn, cause the rods 63 to press downwardly on the rear of the frame 42.

A differential in pressure between the sides may be had by adjusting either or both of the auxiliary pressure adjusting levers 39. It is to be noted, however, that whenever the lever 32 is moved, the pressure on both planters is varied while the differential in pressure between the two planters is maintained.

When it is desired to adjust the planters laterally with relation to the tractor, the clamp 80 on the rod 24 is released and the arms 40 moved to the desired position. The clamp 80 is then resecured.

While I have illustrated and described in detail my invention, it is to be understood that disclosure is merely illustrative and that modifications and changes may be made without departing from the spirit of the invention and within its scope as claimed.

Having described my invention what I claim is:

1. A tractor planter attachment having a frame, a planting device, a ground opening member secured to the frame, ground engaging supporting means for supporting the frame and ground opening member, draft means connecting the tractor to the attachment between the ends of the latter and confining its movements, relative to the tractor, to bodily and pivotal movements in substantially a vertical plane parallel to the line of draft and a single means on the tractor for controlling the bodily lifting of the frame and ground opening member clear of the ground, when moved in one direction and having means for exerting a yielding pressure on the rear portion of the frame but leaving the forward end free for vertical pivotal movement when the controlling means is moved in the opposite direction beyond a predetermined point.

2. A tractor planter attachment having a frame, a planting device, a ground opening member secured to the frame, ground engaging supporting means for supporting the frame and ground opening member, draft means pivotally connecting the tractor to the attachment between its ends and confining its movements, relative to the tractor, to bodily and pivotal movements in substantially a vertical plane parallel to the line of draft, a lever having a connection to the rear of the frame to lift the rear of the frame clear of the ground and including a resilient means for yieldingly pressing the rear end of the frame toward the ground and a flexible connection from the forward portion of the frame to the lever whereby when the lever is moved in one direction both ends of the frame are lifted to move the attachment to a position above the ground and when moved to the working position, the forward end of the frame is free for vertical movement.

3. A tractor planter attachment having a frame, a planting device, a ground opening member secured to the frame, ground-surface bearing and supporting means forward and rearward of the ground opening member for supporting the frame and ground opening member, draft means freely pivoted at its forward end on a substantially horizontal axis to the tractor and freely pivoted at its rear end on a substantially horizontal axis to the planter attachment, the two axes being located in a plane passing substantially through the center of load of the planter attachment, the planter thereby being confined to free vertical and bodily movements in a substantially vertical plane under control of the draft means and the ground surface being traversed.

4. A tractor planter attachment having a frame, a planting device, a ground opening member secured to the frame, a ground-surface bearing and supporting means forward and rearward of the ground opening member for supporting the frame and ground opening member, draft means freely pivoted at its forward end on a substantially horizontal axis to the tractor and freely pivoted at its rear end on a substantially horizontal axis to the planter attachment, the two axes being located in a plane passing substantially through the center of the load of the planter attachment, and a variably controllable resilient means for pressing downwardly on the rear of the frame, at the will of the operator.

CHARLES T. RAY.